(12) United States Patent
Sakai et al.

(10) Patent No.: US 6,701,124 B2
(45) Date of Patent: Mar. 2, 2004

(54) IMAGE READING APPARATUS, IMAGE FORMING APPARATUS, IMAGE READING METHOD AND IMAGE FORMING METHOD

(75) Inventors: Takaaki Sakai, Hachioji (JP); Jun Yokobori, Hachioji (JP); Yoshinao Kitahara, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/243,117

(22) Filed: Sep. 12, 2002

(65) Prior Publication Data

US 2003/0059237 A1 Mar. 27, 2003

(30) Foreign Application Priority Data

Sep. 25, 2001 (JP) ........................................ 2001-290621

(51) Int. Cl.⁷ .............................................. G03G 15/00
(52) U.S. Cl. ....................................... 399/370; 399/376
(58) Field of Search ................................ 399/370, 376; 250/571

(56) References Cited

FOREIGN PATENT DOCUMENTS

JP 11-110150 * 4/1999

* cited by examiner

*Primary Examiner*—Quana M. Grainger
(74) *Attorney, Agent, or Firm*—Frishauf, Holtz, Goodman & Chick, P.C.

(57) ABSTRACT

An image reading apparatus includes: a detecting section for detecting a size of an original sheet; an image reading section for reading an image described in the original sheet; and a storage medium for storing the read image which is read by the image reading section; wherein before the size of the original sheet is detected by the detecting section, the image reading section reads the image to store the read image in the storage medium; and after the size of the original sheet is detected by the detecting section, a size of the stored image which is stored in the storage medium is changed in accordance with the detected size of the original sheet, which is detected by the detecting section.

11 Claims, 6 Drawing Sheets

IMAGE READING APPARATUS, IMAGE FORMING APPARATUS, IMAGE READING METHOD AND IMAGE FORMING METHOD

BACKGROUND OF THE INVENTION

1. Field of the Invention

The present invention relates to an image reading apparatus and an image reading method for reading an image of an original sheet, and to an image forming apparatus and an image forming method for forming an image of an original sheet on a predetermined object.

2. Description of Related Art

According to an earlier development, in case that a plurality of original sheets having different sizes are mixed, as a method for reading each image described on a plurality of original sheets once, the following method was used. The method will be explained with reference to FIG. 5.

Figure 5:
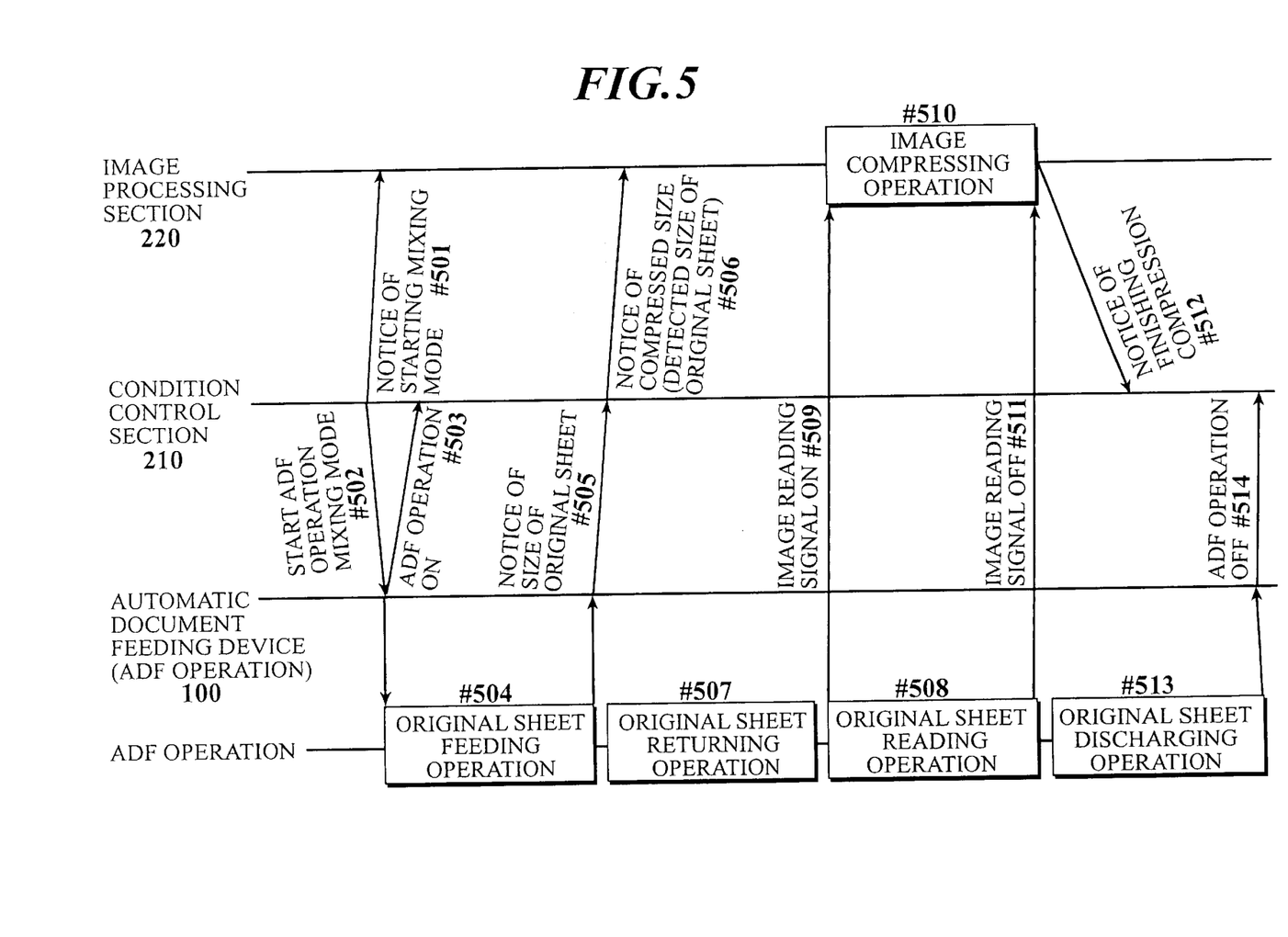
FIG. 5 is a timing chart for explaining the original sheet reading method in the original sheet mixing mode according to an earlier development.

FIG. 5 shows a timing chart for explaining an operation of an original sheet mixing mode according to an earlier development. The original sheet mixing mode is selected and designated with a control panel 201 of the image forming apparatus. The designating signal is transmitted to a condition control section 210. Further, the designating signal is transmitted from the condition control section 210 to an image processing section 220 (#501) and to an automatic document feeding device 100 (#502). The automatic document feeding device 100 notifies the condition control section 210 of a response that the operation of the automatic document feeding device 100 is started (#503).

After receiving the signal #502, the automatic document feeding device 100 feeds the uppermost original sheet P (#504). Even though the original sheet P reaches the position shown in FIG. 4, a reading operation is not started. The original sheet P is fed until the original sheet P reaches the position shown in FIG. 2. When the original sheet P reaches the position shown in FIG. 2, as described above, the size of the original sheet is detected by the original sheet size detecting section 107. Then, the automatic document feeding device 100 notifies the condition control section 210 of the size of the original sheet P (#505). The condition control section 210 notifies the image processing section 220 of a compressed size (#506).

Figure 6:
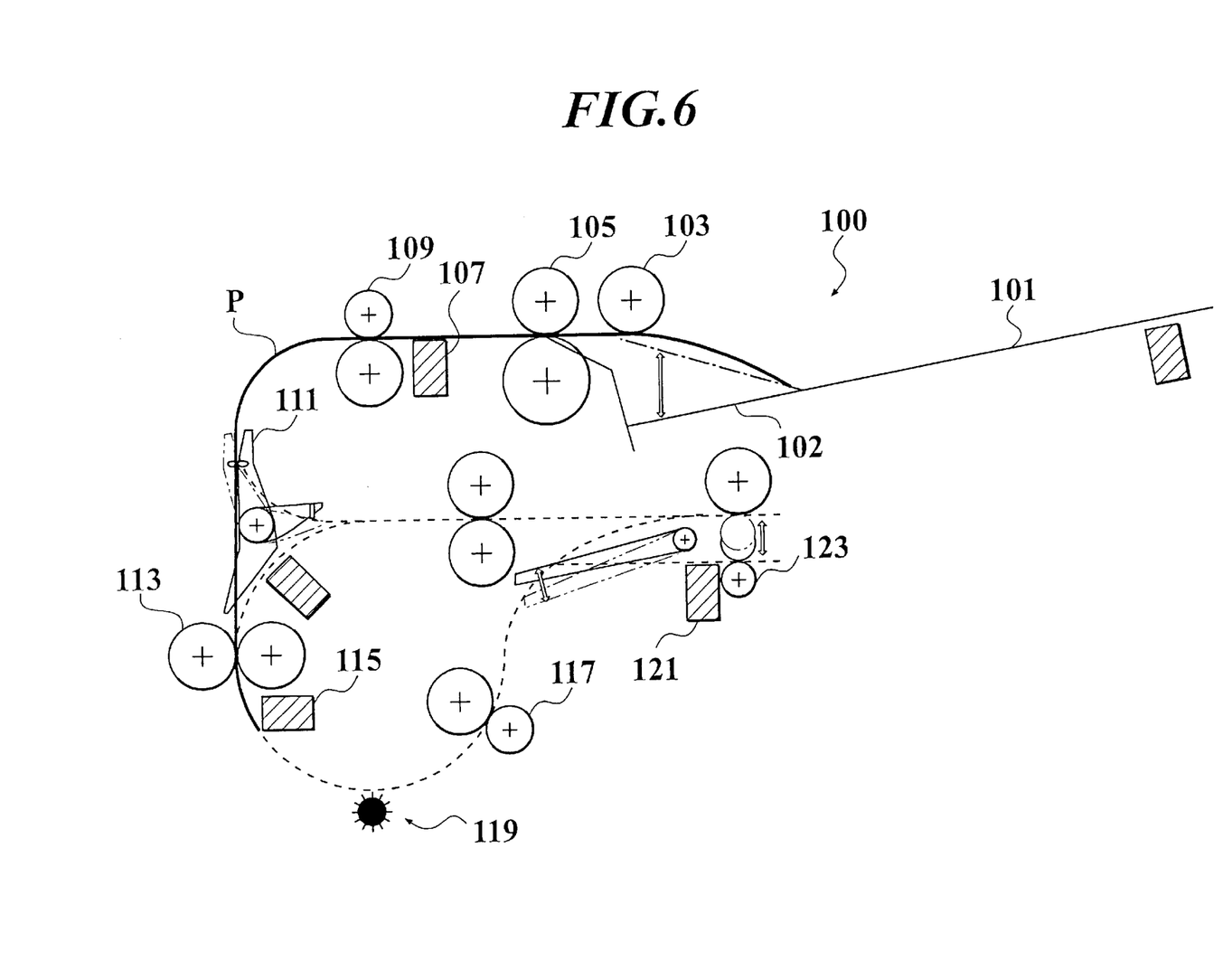
FIG. 6 is a view showing the condition that the front end of the original sheet reaches the read sensor.

Next, the automatic document feeding device 100 switchbacks the original document P so that the front end of the original sheet P is returned slightly behind the read sensor 115 as shown in FIG. 6 (#507). Then, the original sheet P is forwarded again. When the original sheet P reaches the position shown in FIG. 4, the reading of the image of the original sheet is started (#508). At the same time, an image reading signal is transmitted to the image processing section 220 (#509). The page memory 222 carries out an image compressing operation (#510). When the image reading operation finishing signal is transmitted (#511), the finishing signal is outputted to the condition control section 210 (#512). In the automatic document feeding device 100, continuously, the original sheet discharging operation is started (#513). When the discharging operation for the original sheet is finished, a signal for stopping the operation because of the finish of the discharge, is outputted to the condition control section 210 (#514). As described above, according to an earlier development, because the original sheet returning operation is required, there was a problem that the efficiency of the image forming apparatus in the original sheet mixing mode is extremely lowered.

SUMMARY OF THE INVENTION

In order to solve the above-described problems, an object of the present invention is to provide an image reading apparatus, an image forming apparatus, an image reading method and an image forming method, which can start to read an original sheet without carrying out the switchback of the original sheet to recognize the size thereof, even though the original sheet has any size.

That is, in accordance with the first aspect of the present invention, an image reading apparatus comprises:

a detecting section for detecting a size of an original sheet;

an image reading section for reading an image described in the original sheet; and a storage medium for storing the read image which is read by the image reading section;

wherein before the size of the original sheet is detected by the detecting section, the image reading section reads the image to store the read image in the storage medium; and after the size of the original sheet is detected by the detecting section, a size of the stored image which is stored in the storage medium is changed in accordance with the detected size of the original sheet, which is detected by the detecting section.

The image reading apparatus may further comprise: an automatic document feeding device for automatically feeding the original sheet from the detecting section to the image reading section. The detecting section is provided in the automatic document feeding device and the detecting section may detect the size of the original sheet by passing a front end of the original sheet and a rear end of the original sheet through the detecting section.

In accordance with the second aspect of the present invention, an image forming apparatus comprises:

the above-described image reading apparatus; and an image forming section for forming the stored image having the changed size.

The phase "form an image" includes the meaning that the image is printed on a medium, such as a paper, a cloth, a plastic or the like, and the meaning that the image is projected a display, such as a CRT, a TFT or the like, or a screen or the like.

Before the size of the original sheet is detected by the detecting section, the storage medium may store the read image assuming that the size of the original sheet is a maximum original sheet size which is allowable for the image forming apparatus.

The image forming apparatus may further comprise: a copy sheet automatic selecting device for automatically selecting a copy sheet in accordance with the size of the original sheet and a reduction or enlargement magnification.

The image reading apparatus is one for reading the image, however, is one which is not required to form the read image. For example, a facsimile, a scanner and the like are exemplified.

The image forming apparatus is one for forming the read image. For example, a copier machine, a printing machine (a printer), a projector and the like are exemplified.

In accordance with the third aspect of the present invention, an image reading method, comprises:

detecting a size of an original sheet;

reading an image described in the original sheet; and storing the read image;

wherein before the size of the original sheet is detected, the image is read to store the read image; and after the size of the original sheet is detected, a size of the stored image is changed in accordance with the detected size of the original sheet.

The image reading method may further comprise:
automatically feeding the original sheet;
wherein the size of the original sheet is detected by passing a front end of the original sheet and a rear end of the original sheet through a detecting section.

In accordance with the fourth aspect of the present invention, an image forming method, comprises:
the above-described image reading method; and
forming the stored image having the changed size.

Before the size of the original sheet is detected, the read image may be stored assuming that the size of the original sheet is an allowable maximum original sheet size.

The image forming method may further comprise:
automatically selecting a copy sheet in accordance with the size of the original sheet and a reduction or enlargement magnification.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinafter, an embodiment of the present invention will be explained with reference to the drawings.

Figure 2:
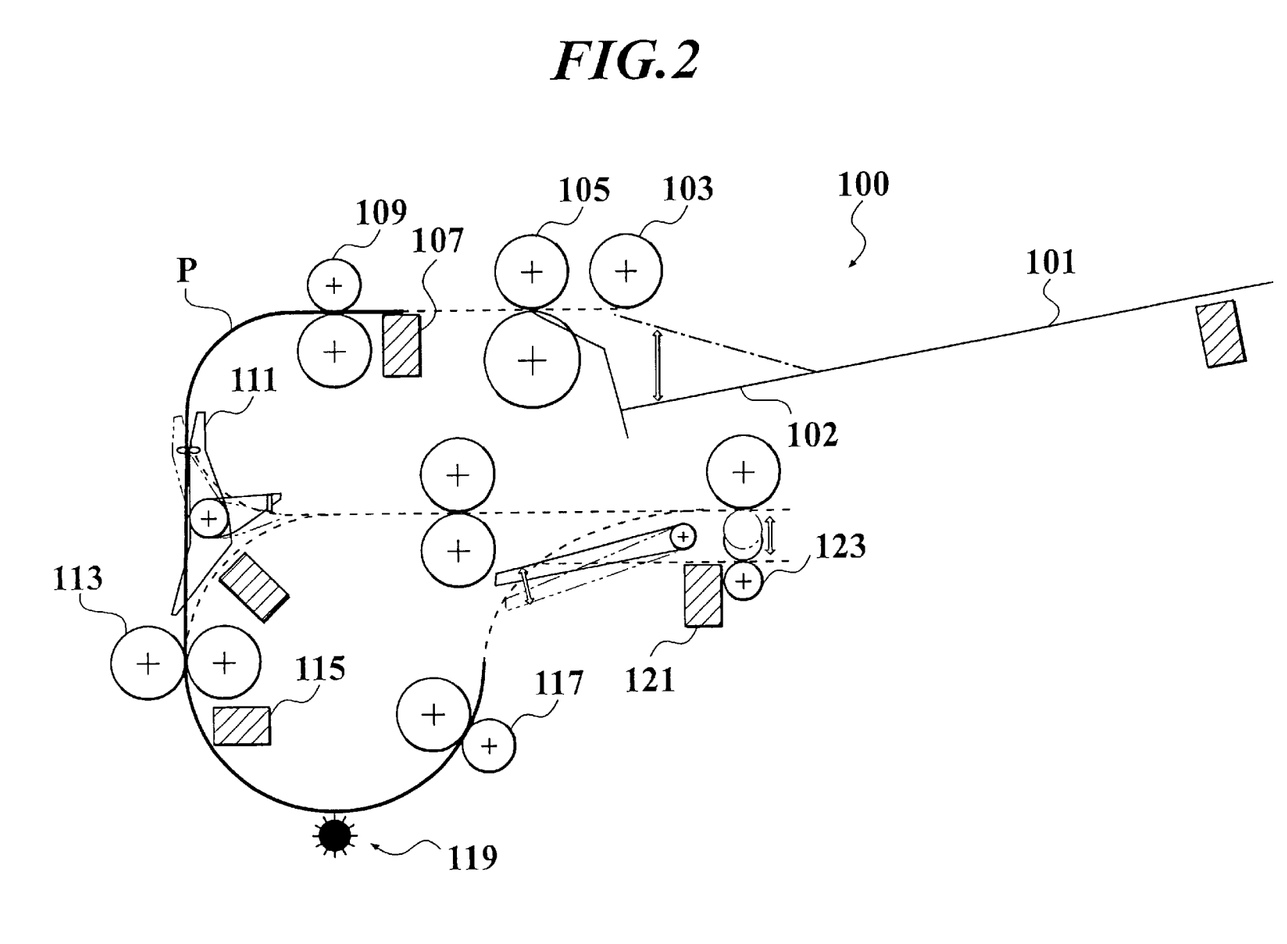
FIG. 2 is a view showing the condition that the rear end of the original sheet reaches the original sheet size detecting section and the size of the original sheet is detected.

FIG. 2 is a view showing a main part of the automatic document feeding device provided in the image forming apparatus. The automatic document feeding device 100 comprises an original sheet stacker 101, a pickup roller 103, sort rollers 105, an original sheet size detecting section 107, resist rollers 109, a reverse gate 111, feed rollers 113, a read sensor 115, feed rollers 117 and the like. A platen glass which is not shown in the drawings, is provided between the read sensor 115 and the feed rollers 117. Under the platen glass, an image reading section 119 having a reading optical system is disposed.

An elevating plate 102 is provided on a front end of the original sheet stacker 101. The elevating plate 102 can alternately takes either position between one shown by a solid line and one shown by a dashed line. In general, on the original sheet stacker 101, a plurality of original sheets having the same size are set so as to stack them. In this case, the size of the original sheet is automatically detected by setting the original sheets on the original sheet stacker 101.

Figure 3:
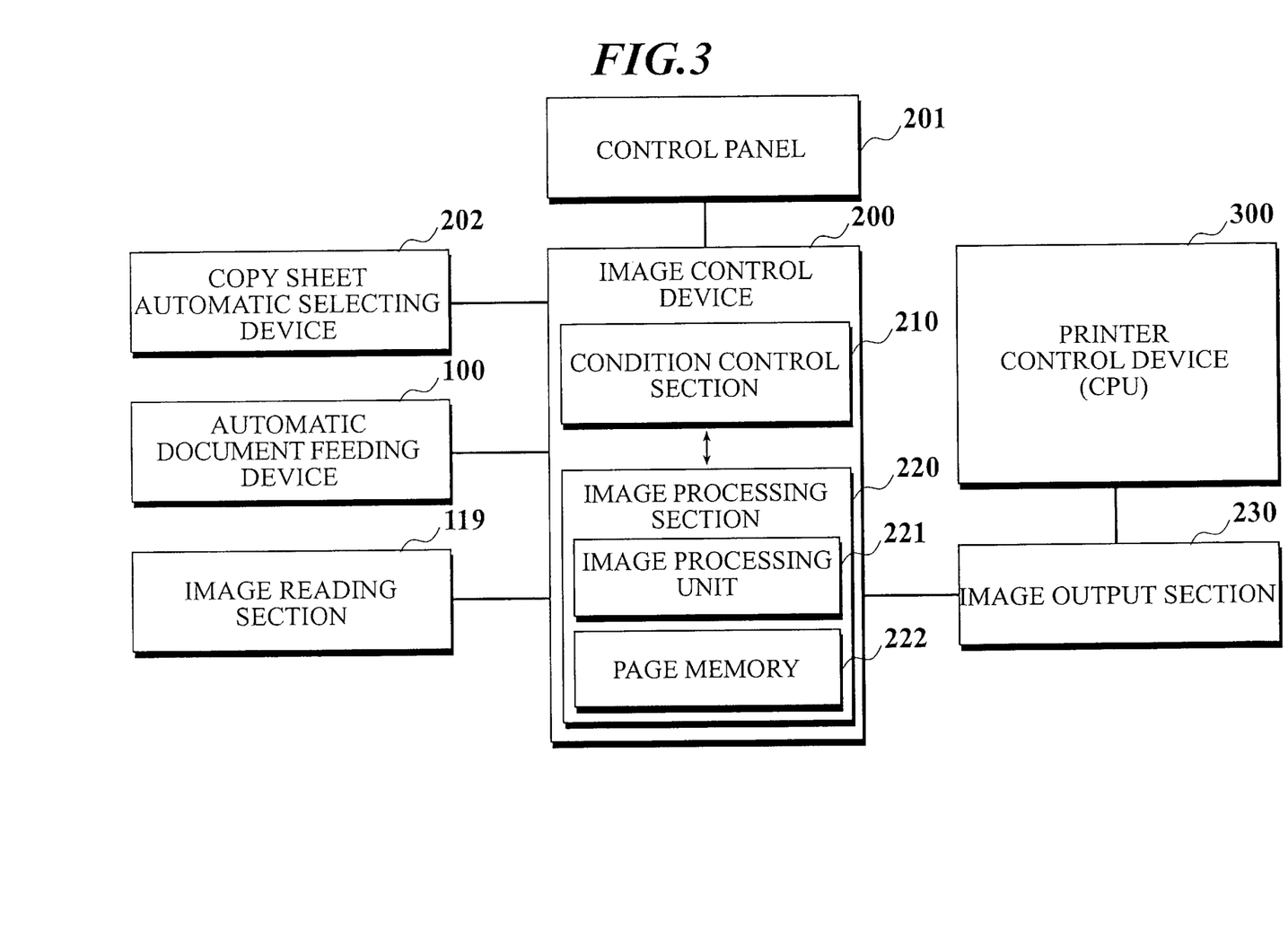
FIG. 3 is a block diagram showing a control device of the image forming apparatus.

FIG. 3 is a block diagram showing a control device of the image forming apparatus. In the control device, two computers which are an image control device 200 and a printer control device 300 are provided. Each device comprises a CPU, a storing medium, such as a flash memory, and the like. The two computers control the whole of the image forming apparatus in accordance with each program installed in the storing medium.

The image control device 200 reads an image from the original sheet, select a copy sheet and select a copy mode, such as the number of copies, a one-sided/two-sided copy and the like. The printer control device 300 copies an image of the original sheet into a copy sheet by actuating a scanner, a paper feeding device, a photosensitive element and the like.

The image control device 200 is connected with the control panel 201, a copy sheet automatic selecting device 202, the automatic document feeding device (ADF) 100 and the image reading section 119. In the image control device 200, the condition control section 210 and the image processing section 220 are provided. The control panel 201 is one for inputting an image forming condition, such as a paper tray to be used, a magnification, the original sheet mixing mode and the like, and for displaying the inputted condition. The copy sheet automatic selecting device 202 automatically selects a necessary copy sheet in accordance with the size of the original sheet and the magnification, such as reduction/enlargement.

The image processing section 220 comprises an image processing unit 221 and the page memory 222. The data stored in the image processing section 220 is outputted to the printer control device 300 through the image output section 230. Then, the image of the original sheet is copied into the copy sheet.

By elevating the elevating plate 102 to the position shown by a dashed line, the uppermost original sheet is fed with the pickup roller 103. In case that a plurality of original sheets are fed, when the fed original sheets reach the sort rollers 105, the second or later original sheets are returned by the sort rollers 105.

The front end of the original sheet passes through the sort rollers 105. Further, the front end thereof passes through the resist rollers 109 and reaches the reverse gate 111. In case of the two-sided original sheet, the reverse gate 111 reverses the original sheet. In this case, because only the one-sided original sheet is handled, the explanation of the reverse gate 111 is omitted.

The original sheet which passes through the reverse gate 111, is beyond the feed rollers 113 and reaches the read sensor 115. After the predetermined time elapsed since the front end of the original sheet reaches the read sensor 115, the image reading section 119 starts to read the image of the original sheet. While the image of the original sheet is read, the original sheet passes through the feed rollers 117, is detected by the discharge detecting sensor 121 and is discharged to a discharging section which is not shown in the figure, by the discharging roller 123.

While the original sheet passes, the image reading section 119 continues to read the original sheet. The image data which is read by the image reading section 119, such as a scanner or the like, is fetched into the image processing section 220. After the data passes through the image processing unit 221 for carrying out the image process, such as a gamma control, the data is temporarily stored in the page memory 222.

Because the read data is not compressed, the data has such a large size that it is difficult to handle the data. Therefore, the data is compressed. Further, because the size of the original document is determined and the magnification is given, the size of the copy sheet is determined. Therefore, when the front end of the original sheet passes above the image reading section 119, the reading of the image of the original sheet is immediately started. At the same time, the data compression can be carried out in accordance with the size of the original sheet. The image data stored in the page memory 222 is outputted to the image output section 230 in order to form a copied image.

The above description is one for explaining the image reading method in case of the original sheets having the same size. In case that a plurality of original sheets having different sizes are set on the original sheet stacker 101 so as to stack them, in the above method, the original sheets are read as if they have the same size. Therefore, when an original sheet which is larger than other original sheets is mixed, the problem that an image of the larger original sheet is not partially read, is caused. Conversely, when an original sheet which is smaller than other original sheets is mixed, a small image is copied on a large copy sheet. As a result, the sheet is wasted.

In order to solve the above problem, there is an image forming apparatus that an original sheet mixing mode can be designated by the control panel 201. When the original sheet mixing mode is designated, the size of the original sheet is not detected only by setting the original sheet on the original sheet stacker 101. The size of the original sheet is detected by the original sheet size detecting section 107 provided between the sort rollers 105 and the resist rollers 109. That is, in order to detect the size of the original sheet, by utilizing the constant feeding speed of the original sheet, the period from the time that the front end of the original sheet reaches the original sheet size detecting section 107 to the time that the rear end of the original sheet reaches the original sheet size detecting section 107 is measured.

Figure 4:
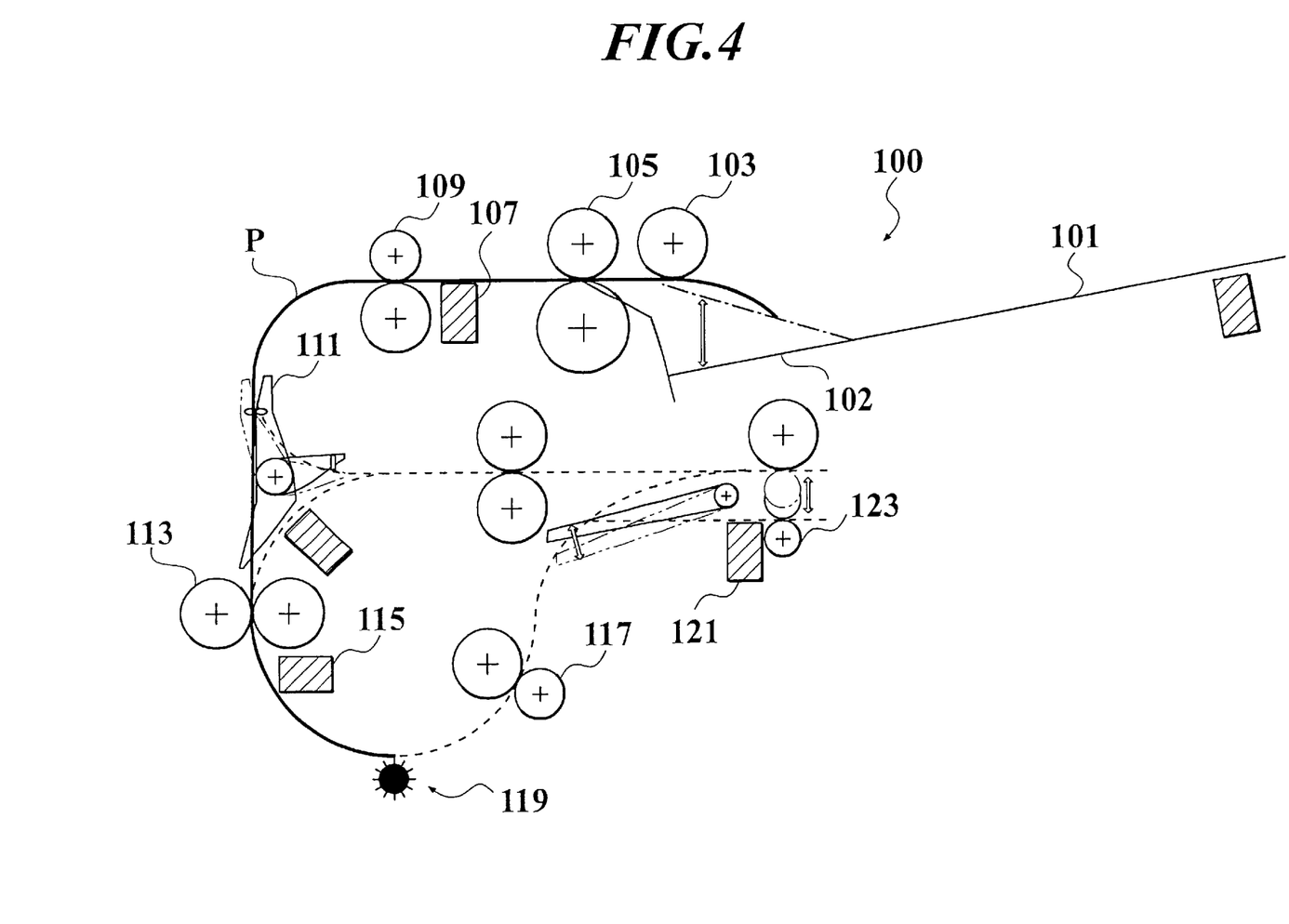
FIG. 4 is a view showing the condition that the front end of the original sheet reaches the image reading section in the automatic document feeding device.

However, in this case, the size of the original sheet P cannot be recognized until the rear end of the original sheet P does not reach the original sheet size detecting section 107 like the original sheet P shown by a bold line in FIG. 2. Therefore, as shown in FIG. 4, in case that although the front end of the original sheet P reaches the image reading section 119, the rear end of the original sheet P does not reach the original sheet size detecting section 107, the reading cannot be started.

In this embodiment, each image described in a plurality of original sheets having different sizes is successively read as follows.

Figure 1:
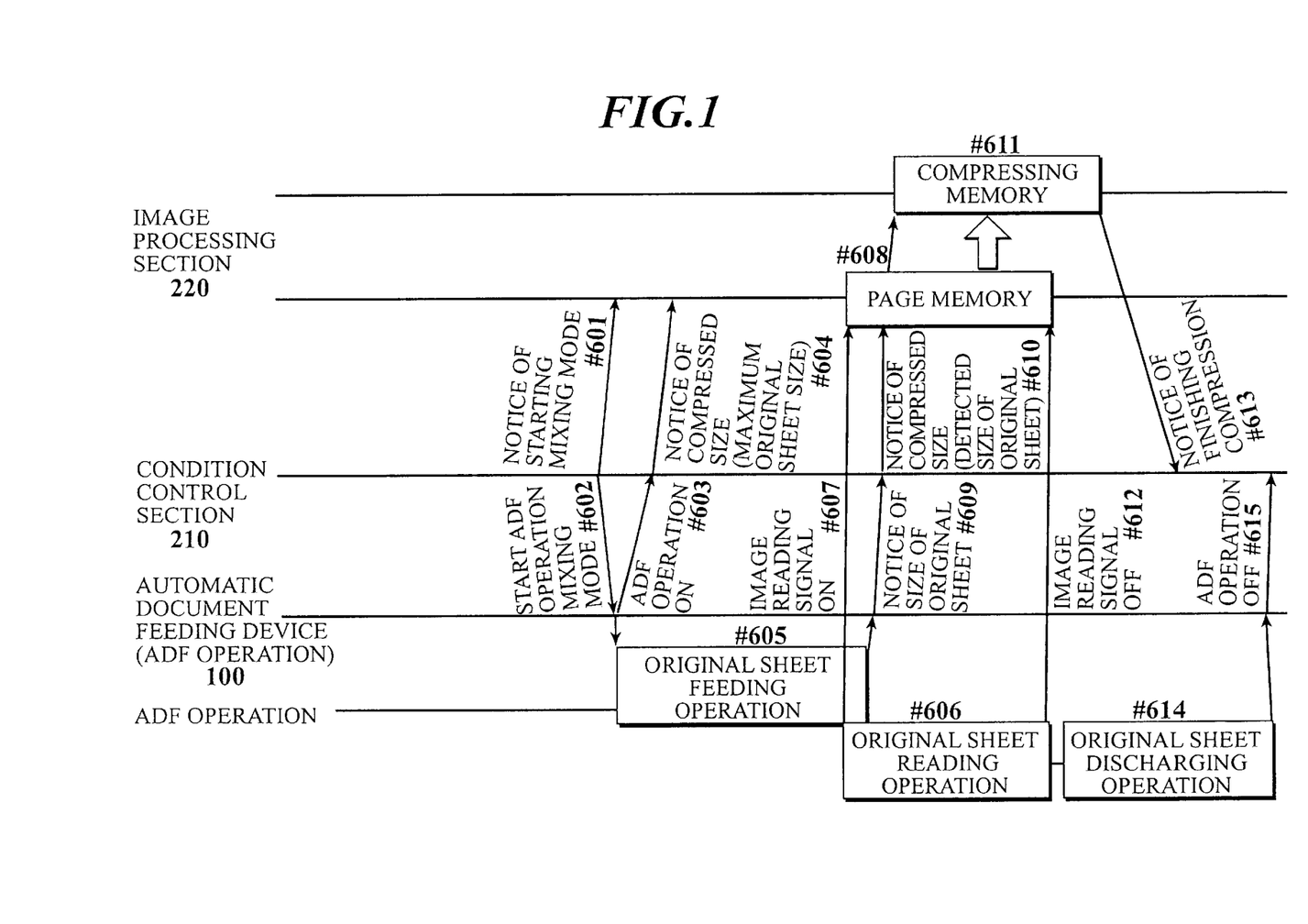
FIG. 1 is a timing chart for explaining the original sheet reading method in the original sheet mixing mode according to the present invention.

FIG. 1 is a timing chart for explaining the original sheet reading method in the original sheet mixing mode according to the present invention.

At first, the original sheet mixing mode is designated by the control panel 201. Further, it is selected to use the copy sheet automatic selecting device 202. Then, the designing signal is transmitted to the condition control section 210. Further, the signal is transmitted from the condition control section 210 to the image processing section 220 (#601) and the automatic document feeding device 100 (#602). The automatic document feeding device 100 notifies the condition control section 210 of a response that the operation of the automatic document feeding device 100 is started (#603).

The condition control section 210 notifies the image processing section 220 of the maximum original sheet size in which the image forming apparatus can copy the image (#604). One original sheet P set on the original sheet stacker 101 is fed by the automatic document feeding device 100.

When the front end of the original sheet P reaches the original sheet size detecting section 107, it is started that the size of the original sheet is detected.

After the predetermined time period elapses from the time that the front end of the original sheet P reaches the read sensor 115 as shown in FIG. 6, the front end of the original sheet P reaches the image reading section 119 as shown in FIG. 4. Then, the reading thereof is started (#606).

When the reading operation is started, the reading signal is transmitted to the page memory 222 of the image processing section 220 (#607). The page memory 222 starts to prepare a provisional page data on the assumption that the size of the original sheet is the maximum original sheet size which is transmitted by the signal #604. When the provisional page data is prepared, the data is not compressed.

On the other hand, by the original sheet feeding operation which is continuously carried out, the rear end of the original sheet P reaches the original sheet size detecting section 107 as shown in FIG. 2 while the original sheet reading operation is carried out. As a result, the size of the original sheet is detected. The detected size of the original sheet is transmitted from the automatic document feeding device 100 to the condition control section 210 (#609). Further, the detected size is transmitted from the condition control section 210 to the image processing section 220 as a compressed size (#610).

While the page memory 222 continues to prepare the provisional page data, the page memory 222 simultaneously compresses the provisional page data in accordance with the actual size of the original sheet to start preparing a page data in parallel (#611). When an image reading operation finishing signal is transmitted from the automatic document feeding device 100 (#612), a finishing signal is output to the image processing section 220 to finish preparing the provisional page data. Thereafter, the preparation of the page data (#611) is finished. A compression finish notifying signal is received by the condition control section 210 (#613). In the automatic document feeding device 100, an original sheet discharging operation is started (#614), consecutively. When the discharge of the original sheet is finished, a signal for stopping the operation because of the finish of the discharge is outputted to the condition control section 210 (#615). As a result, the original sheet reading process is finished.

Then, the image data stored in the page memory 222 is outputted to the printer control device 300 through the image output section 230. The image of the original sheet is copied to a copy sheet selected by the copy sheet automatic selecting device 202 in accordance with the size of the original sheet and the magnification, such as a reduction or an enlargement.

In this embodiment, because the original sheet returning operation (#507) shown in FIG. 5 is not required, in the original sheet mixing mode, the image forming time can be shortened. As a result, the efficiency of the image forming apparatus can be improved. Further, because the time period for the original sheet feeding operation (#605) and the time period for the original sheet reading operation (#606) overlap, the operation time can be shorten by the above overlapping time period.

Further, in this embodiment, even though when a plurality of original sheets to be read have the same size or the original sheet to be read is only one, the image reading apparatus does not recognize the size of the original sheet before the image of the original sheet is read and the original sheet is so large that the front end of the original sheet P reaches the image reading section 119 before the rear end of the original sheet P reaches the original sheet size detecting section 107, it is possible to read the image without carrying out the switchback of the original sheet.

As described above, according to the image forming apparatus of the present invention, in case that, for example, the original sheet mixing mode is selected, even though when the front end of the original sheet transmitted by the automatic document feeding device reaches the image reading section, the original sheet size detecting section has not detected the size of the original sheet, the image reading section starts to read the image. At the same time, the page memory prepares a provisional page data on the assumption that the read original sheet has the predetermined size. After the original sheet size detecting section detects the size of the original sheet, the page memory prepare a page data by compressing the provisional page data into a data having a specific size. Therefore, even in the original sheet mixing mode, or the like, in order to recognize the size of the original sheet, it is not necessary to carry out the switchback of the original sheet. As a result, the inefficient operation of the image forming apparatus can be omitted, and the efficiency of the image forming apparatus can be improved.

The entire disclosure of Japanese Patent Application No. Tokugan 2001-290621 filed on Sep. 25, 2001 including specification, claims drawings and summary are incorporated herein by reference in its entirety.

What is claimed is:

1. An image reading apparatus comprising:

a detecting section for detecting a size of an original sheet;

an image reading section for reading an image described in the original sheet; and a storage medium for storing the read image which is read by the image reading section;

wherein before the size of the original sheet is detected by the detecting section, the image reading section reads the image to store the read image in the storage medium; and after the size of the original sheet is detected by the detecting section, a size of the stored image which is stored in the storage medium is changed in accordance with the detected size of the original sheet, which is detected by the detecting section.

2. The image reading apparatus of claim 1, further comprising: an automatic document feeding device for automatically feeding the original sheet from the detecting section to the image reading section.

3. The image reading apparatus of claim 2, wherein the detecting section is provided in the automatic document feeding device and the detecting section detects the size of the original sheet by passing a front end of the original sheet and a rear end of the original sheet through the detecting section.

4. An image forming apparatus comprising:

the image reading apparatus of claim 1; and an image forming section for forming the stored image having the changed size.

5. The image forming apparatus of claim 4, wherein before the size of the original sheet is detected by the detecting section, the storage medium stores the read image assuming that the size of the original sheet is a maximum original sheet size which is allowable for the image forming apparatus.

6. The image forming apparatus of claim 4, further comprising: a copy sheet automatic selecting device for automatically selecting a copy sheet in accordance with the size of the original sheet and a reduction or enlargement magnification.

7. An image reading method, comprising:

detecting a size of an original sheet;

reading an image described in the original sheet; and storing the read image;

wherein before the size of the original sheet is detected, the image is read to store the read image; and after the size of the original sheet is detected, a size of the stored image is changed in accordance with the detected size of the original sheet.

8. The image reading method of claim 7, further comprising: automatically feeding the original sheet;

wherein the size of the original sheet is detected by passing a front end of the original sheet and a rear end of the original sheet through a detecting section.

9. An image forming method, comprising:

the image reading method of claim 7; and forming the stored image having the changed size.

10. The image forming method of claim 9, wherein before the size of the original sheet is detected, the read image is stored assuming that the size of the original sheet is an allowable maximum original sheet size.

11. The image forming method of claim 9, further comprising: automatically selecting a copy sheet in accordance with the size of the original sheet and a reduction or enlargement magnification.

\* \* \* \* \*